(12) United States Patent
Ballintine et al.

(10) Patent No.: US 6,724,996 B1
(45) Date of Patent: Apr. 20, 2004

(54) APPARATUS AND METHOD FOR PROVIDING OPTICAL CHANNEL OVERHEAD IN OPTICAL TRANSPORT NETWORKS

(75) Inventors: James E. Ballintine, Colts Neck, NJ (US); Paul Anthony Bonenfant, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/474,722

(22) Filed: Dec. 29, 1999

(51) Int. Cl.[7] ............................................. H04J 14/08
(52) U.S. Cl. ........................... 398/98; 398/43; 398/99; 370/395.4; 370/395.41
(58) Field of Search ........................... 359/124; 398/43, 398/98, 99; 370/509, 510, 511, 512, 235, 230, 231, 395, 395.41

(56) References Cited

U.S. PATENT DOCUMENTS

| | | | | |
|---|---|---|---|---|
| 5,303,078 A | * | 4/1994 | Brackett et al. | 359/123 |
| 5,357,360 A | * | 10/1994 | Imhoff et al. | 359/110 |
| 5,905,585 A | * | 5/1999 | Shirai | 359/110 |
| 5,914,794 A | | 6/1999 | Fee et al. | |
| 5,936,949 A | * | 8/1999 | Pasternak et al. | 370/310.1 |
| 5,995,256 A | * | 11/1999 | Fee | 359/124 |
| 6,111,673 A | * | 8/2000 | Chang et al. | 359/123 |
| 6,122,082 A | * | 9/2000 | Fishman | 359/117 |
| 6,271,946 B1 | * | 8/2001 | Chang et al. | 359/123 |
| 6,323,978 B1 | * | 11/2001 | Harley et al. | 359/154 |
| 6,411,410 B1 | * | 6/2002 | Wright et al. | 359/123 |

OTHER PUBLICATIONS

ITU–T Recommedation G.872, Architecture of Optical Transport Networks, Feb. 1999.

ITU–T D.371 (WPs 3, 4/15), "Subcarrier Modulation of Client Signals: Implementation Issues", Nortel, Oct. 1998.

ITU–T D.295 (WP 3/15), "OCh Overhead Transport using Pilot–tone Modulation", NTT, Oct. 1998.

ITU–T D.283 (WPs 3, 4/15), "Limitations and deficiences of sub–carrier modulation for OCh overhead transport", Siemens AG, Germany, Oct. 1998.

ITU–T COM15–121, "Signal Quality Monitoring In Optical Networks", Ericsson, Aug. 1998.

R. Alferness et al., "A Practical Vision for Optical Transport Networking", *Bell Labs Technical Journal*, vol. 4, No. 1, Jan.–Mar. 1999.

ITU–T Recommendation G.975 (11/96), "Forward error correction for submarine systems", 1996.

* cited by examiner

*Primary Examiner*—Leslie Pascal
*Assistant Examiner*—David C. Payne

(57) ABSTRACT

A so-called digital "wrapper" is employed in conjunction with an optical channel client signal payload envelope to carry optical channel associated optical channel overhead. That is, the digital wrapper transports optical channel associated optical channel overhead and other monitoring information. This is realized by adding additional capacity, i.e., bandwidth, to the client signal payload envelope. The additional capacity is added "around" the payload envelope and the client signal floats in the payload envelope. This is effected in such a manner that the digital wrapper is independent of the type of client signal that is being transported on the optical channel. Indeed, as such the optical payload envelope is essentially a client optical signal independent, constant bit-rate channel. Moreover, in addition to the digital wrapper providing capacity for the optical channel overhead, it can also be employed to provide a forward error correction capability. Additionally, the added digital wrapper readily provides access for performance monitoring and, especially, access to electrical BER (bit error rate).

40 Claims, 9 Drawing Sheets

100

|  | OCH-OH | PAYLOAD | | | | CHECK BYTES | | | | |
|---|---|---|---|---|---|---|---|---|---|---|
|  | COL. 1 | COL. 2 | · | · | · | COL. 239 | COL. 240 | · | · | COL. 255 |
| SUBFRAME 1 | 1 | 17 | · | · | · | 3809 | 3825 | · | · | 4065 |
| SUBFRAME 2 | 2 | 18 | · | · | · | 3810 | 3826 | · | · | 4066 |
| SUBFRAME 3 | 3 | 19 | · | · | · | 3811 | 3827 | · | · | 4067 |
| ⋮ | ⋮ | ⋮ | ⋮ | ⋮ | ⋮ | ⋮ | ⋮ | ⋮ | ⋮ | ⋮ |
| SUBFRAME 16 | 16 | 32 | · | · | · | 3824 | 3840 | · | · | 4080 |

FIG. 6

| SUBFRAME# | FRAMING | MISCELLANEOUS OCh-OH | | BIP |
|---|---|---|---|---|
| | FRAME 1 | FRAME 2 | FRAME 3 | FRAME 4 |
| 1 | OA1 FRAMING | TBD | TBD | OCh BIP-8 |
| 2 | OA1 FRAMING | TBD | TBD | OCh BIP-8 |
| 3 | OA1 FRAMING | TBD | TBD | OCh BIP-8 |
| 4 | OA1 FRAMING | TBD | TBD | OCh BIP-8 |
| 5 | OA1 FRAMING | TBD | TBD | OCh BIP-8 |
| 6 | OA1 FRAMING | TBD | TBD | OCh BIP-8 |
| 7 | OA1 FRAMING | TBD | TBD | OCh BIP-8 |
| 8 | OA1 FRAMING | TBD | TBD | OCh BIP-8 |
| 9 | OA2 FRAMING | TBD | TBD | OCh BIP-8 |
| 10 | OA2 FRAMING | TBD | TBD | OCh BIP-8 |
| 11 | OA2 FRAMING | TBD | TBD | OCh BIP-8 |
| 12 | OA2 FRAMING | TBD | TBD | OCh BIP-8 |
| 13 | OA2 FRAMING | TBD | TBD | OCh BIP-8 |
| 14 | OA2 FRAMING | TBD | TBD | OCh BIP-8 |
| 15 | OA2 FRAMING | TBD | TBD | OCh BIP-8 |
| 16 | OA2 FRAMING | TBD | TBD | OCh BIP-8 |

OCh PROCESSOR DATA FLOW

DIGITAL WRAPPER INSERTION MODE

DIGITAL WRAPPER REMOVAL MODE

DIGITAL WRAPPER OCh-S & OCh-D LAYER ACCESS

APPARATUS AND METHOD FOR PROVIDING OPTICAL CHANNEL OVERHEAD IN OPTICAL TRANSPORT NETWORKS

RELATED APPLICATION

U.S. patent application Ser. No. 09/474,981 was filed concurrently herewith.

TECHNICAL FIELD

This invention relates to optical transport networks and, more particularly, to optical channel overhead.

BACKGROUND OF THE INVENTION

It has been determined that it is desirable to provide some optical channel associated overhead. That is, overhead that must follow a particular optical channel connection. Some requirements of such optical channel overhead include the ability to obtain correct validation of connectivity integrity, enhanced assessment of transmission quality, i.e., performance monitoring, and detection and indication of transmission defects.

It is also very desirable that the optical channel overhead be transmitted in such a manner that it is independent of the optical channel client signal type.

In providing these desirable features, it is important that misrouting be avoided of the client signal payload and overhead, scalability issues be avoided related to the adding of optical channels as each optical channel provides its own overhead and advantage is taken of low latency communications between optical channel termination points.

It has been proposed to employ so-called sub-carrier modulation, which employs pilot tones or some other modulation technique to carry the optical channel overhead. However, such modulation techniques add undesirable noise to the optical channel and, hence, the client signal. Consequently, there is a trade off between the level of noise added and the client signal data rate that can be realized. Indeed, the pilot tones compete for spectrum with the low frequency portion of the spectrum of the optical channel client signal. This leads to use of pilot tone frequencies that are dependent on the optical channel client signal.

Additional possible problems resulting from using such sub-carrier or other modulation techniques include: the channel associated optical channel overhead being bit rate constrained in order to minimize impairments to the client signal; the sub-carrier modulation technique frequency and bit rate being dependent on the client signal type; the sub-carrier modulation technique actually ensuring an undesirable level of performance degradation of the client signal; and the use of the sub-carrier modulation technique limiting sub-layer monitoring.

SUMMARY OF THE INVENTION

These and other problems and limitations of prior proposed techniques for carrying optical channel overhead are overcome by employing a so-called digital "wrapper" in conjunction with an optical channel client signal payload envelope to carry optical channel associated optical channel overhead. That is, the digital wrapper transports optical channel associated optical channel overhead and other monitoring information. This is realized by adding additional capacity, i.e., bandwidth, to the client signal payload envelope. The additional capacity is added "around" the payload envelope and the client signal floats in the payload envelope. This is effected in such a manner that the digital wrapper is independent of the type of client signal that is being transported on the optical channel. Indeed, as such the optical payload envelope is essentially a client optical signal independent, constant bit-rate channel.

Moreover, in addition to the digital wrapper providing capacity for the optical channel overhead, it can also be employed to provide a forward error correction capability.

Additionally, the added digital wrapper readily provides access for performance monitoring and, especially, access to electrical BER (bit error rate).

Technical advantages of employing a digital wrapper, in accordance with the invention, are that it is independent of the client signal type and does not degrade the client signal.

BRIEF DESCRIPTION OF THE DRAWING

FIG. 6 graphically illustrates one example of a multiframe structure for the optical channel-overhead (OCh-OH);

DETAILED DESCRIPTION

Figure 1:
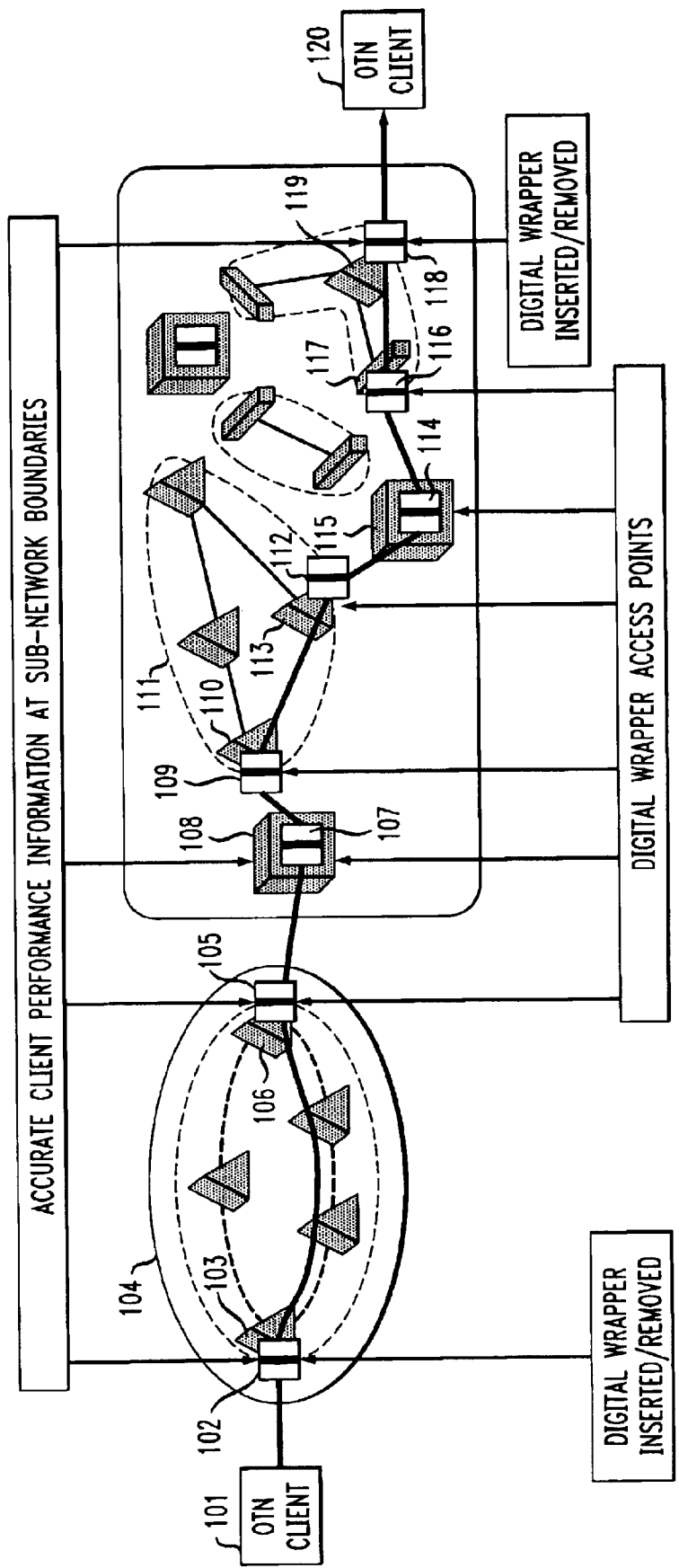
FIG. 1 illustrates in simplified form a communication system including an optical transport network in which the invention can advantageously be employed.

FIG. 1 illustrates, in simplified form, an optical transport network (OTN) 100, for example, an optical network employing wavelength division multiplexing (WDM) of optical signals, in which the invention can advantageously be employed. Specifically, shown is an OTN client 101 that in this example, accesses OTN 100 via optical-electronic processor (OEP) 102 in or at optical add-drop multiplexer (OADM) 103 in a ring subnetwork 104 including a plurality of nodes each having an OADM. In this example, OEP 102 allows for the insertion and removal of the overhead carried by ,the digital wrapper of this invention added to the optical channel client signal payload envelope, as well as, the availability of accurate client performance information at the sub-network 104 boundary. As such the digital wrapper is associated with its related optical channel and, thus, carries the optical channel associated optical channel overhead. At OEP 105 associated with OADM 106 the information carried by the digital wrapper can be accessed to obtain accurate client performance information. In similar fashion, the digital wrapper information is accessible to obtain accurate client performance information at each of OEPs 107, 109, 112, 114 and 116 associated with cross connect 108, OADM 110, OADM 112, cross connect 115, and optical line system 117, respectively. Again, OADM 110 and OADM 113 are part of ring network 111. At OEP 118 associated with OADM 119 the information carried by the digital wrapper can be inserted or removed in association with OTN client 120. Additionally, accurate client performance information is also available at OEPs 102 and 118. Thus, as seen, the desirable client performance information is made available at each of the sub-network boundaries by use of the digital wrapper, in accordance with this invention. As is described below, end-to-end OCh performance is obtained by employing bit interleaved parity. While incremental performance is obtained by employing forward error correction (FEC).

Figure 2:
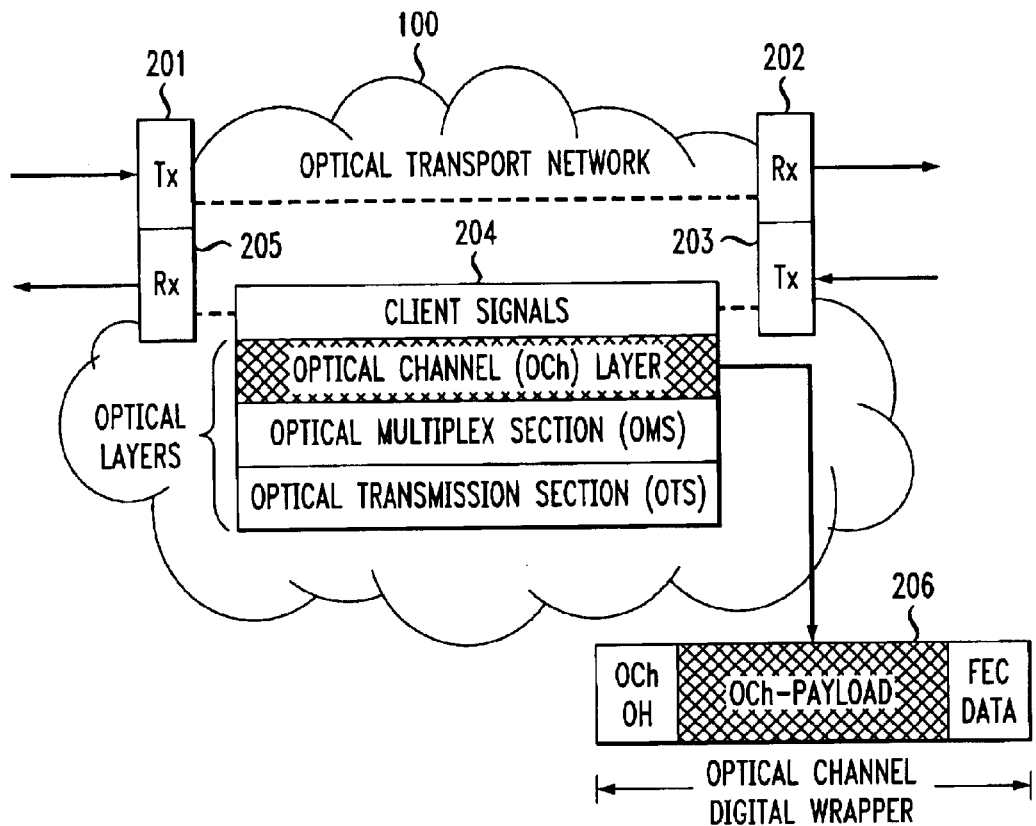
FIG. 2 shows in simplified form an example application of a digital wrapper in an optical transport network.

FIG. 2 shows in simplified form an example application of an optical channel digital wrapper in an optical transport network 100. Specifically, shown is OTN 100 including, by way of a simplified example, optical transmitter (Tx) 201 and associated optical receiver (Rx) 202 for transmitting optical channels including client signals in a first direction of transmission, and Tx 203 for transmitting optical signals each having optical layer 204 to Rx 205 in a second direction of transmission. Optical layers 204 include an optical channel (OCh) layer, optical multiplex section (OMS) and optical transmission section (OTS). The OCh layer includes digital container 200, which in accordance with the invention includes a client signal payload envelope having OCh payload bandwidth, and a digital wrapper 206 having OCh-OH bandwidth and FEC data bandwidth. Note that the digital wrapper 206 is "around" the OCh payload envelope bandwidth that transports a client signal that floats in the payload envelope. In this example, the client signals may include SONET (synchronous optical network), SDH (synchronous digital hierarchy), ATM (asynchronous transfer mode), FDDI (fiber data distribution interface), SDL (simple data link), IP (internet protocol), GbE (gigabit ethernet), PDH (plesiochronous digital hierarchy) or the like. Details of digital wrapper 206 are described in more detail below.

Figure 3:
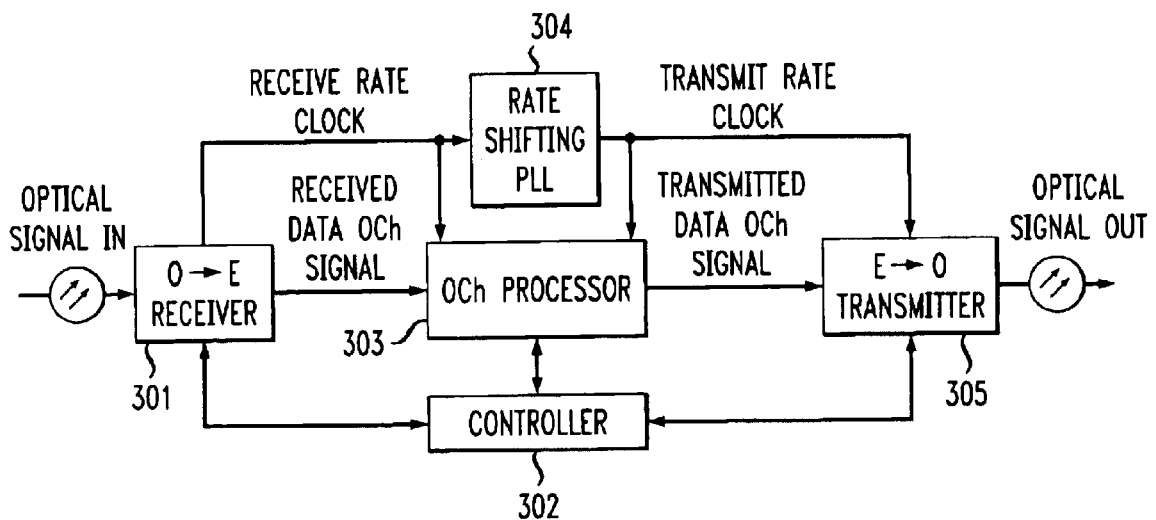
FIG. 3 shows, in simplified form, an optical-electronic processor in which an embodiment of the invention can be implemented.
Figures 4, 5:
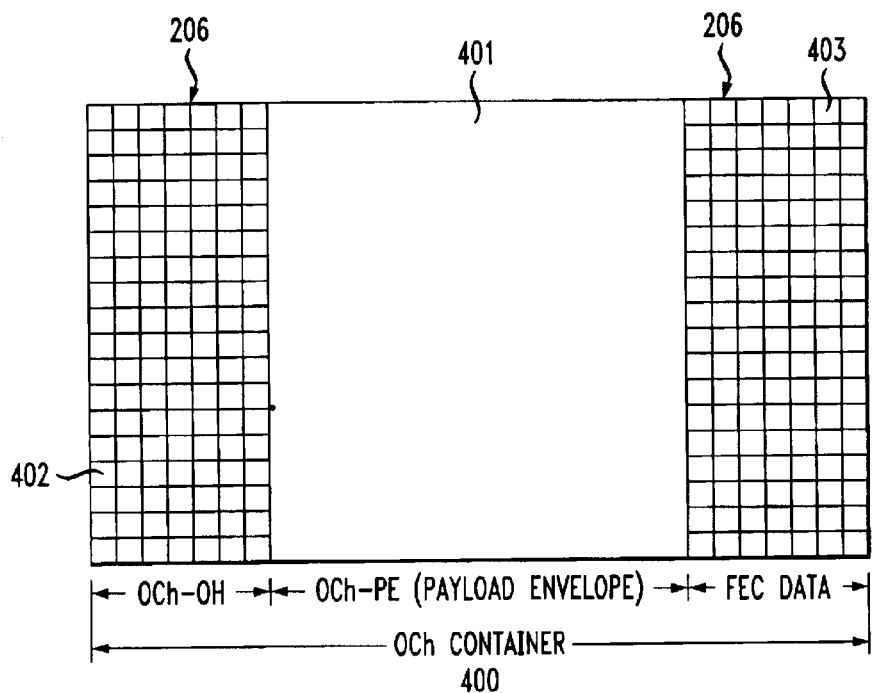
FIG. 4 shows a graphical representation of an optical channel (OCh) container including a digital wrapper in accordance with the invention.
FIG. 5 graphically illustrates one example of a basic frame structure for the optical channel.

FIG. 3 shows, in simplified form, an optical-electronic processor 300 in which an embodiment of the invention can be implemented. For simplicity and clarity of exposition only one direction of transmission is shown and described here. It will be apparent to those skilled in the art that the transmission of optical signals in a practical transport network may require bidirectional transmission. Specifically, incoming optical signals including optical channels carrying client signals are received via optical receiver 301. Optical receiver 301 includes apparatus for, in this example, converting the received optical signal into an electrical signal, extracting a client data signal and a received clock rate under control of controller 302, in well known fashion. Such optical receivers are known in the art. The received client data signal and received clock rate are supplied to OCh processor 303. As shown in FIG. 4, OCh processor 303, in accordance with the invention, allocates, i.e., adds, the OCh digital wrapper 206 including overhead bandwidth 402 and FEC data bandwidth 403 to payload envelope bandwidth 401 that carriers the OCh client signal to form OCh container 400. This is realized by allocating, i.e., generating, a client signal payload envelope bandwidth 401, and allocating and adding additional bandwidth to the client signal payload envelope 401 to carry the OCh-OH 402, which in this example, includes OCh-Path overhead, OCh-Domain overhead and OCh-Path overhead. The domain may be, for example, a tandem connection. Bandwidth may also be allocated and added to carry forward error correction (FEC). Further details of one example of a FEC arrangement that may be advantageously employed in this embodiment of the invention is described in ITU-T G.975 dated November 1996 and entitled "Forward error correction for submarine systems". The digital wrapper 206 is added "around" the client payload envelope bandwidth 401 in the sense that, in this example, the OCh-OH bandwidth 402 is added to one side of the payload envelope bandwidth 401 and the FEC bandwidth 403 is added to the other side of the payload envelope bandwidth 401, as shown in FIG. 4. Note that the OCh-OH information may be related to performance monitoring, and/or performance measurement, and/or operations, and/or administration, and/or maintenance information, and/or the like for the individual ones of one or more optical channels.

As indicated, the client signal is inserted in the optical channel signal such that it "floats" in the digital container 400 payload envelope 401. Indeed, the format of the OCh client signal is only constrained by the OCh container 400 format. The client signal need only be a constant bit-rate digital signal within the bandwidth of a so-called 3R-regenerator function. As such, the OCh payload envelope 401 can be viewed as a client signal format independent, constant bit-rate channel. Indeed, payload envelope 401 is such that the client signal floats therein without the need for pointers to identify its location. Note that the 3R regenerator function denotes regeneration/amplification, reshaping and retiming at sub-network and administrative domain boundaries to provide required OCh performance monitoring and to effect hand-off of a clean signal between operators. Apparatus for effecting such regeneration functions is known in the art. If should be further noted, that an advantage of employing a digital wrapper, in accordance with the invention, is that as new client signal formats emerge they can be transported, without the need for any changes to OTN 100. It is noted, however, that client signal-specific apparatus may be required to process the new client signals.

Another advantage of the invention is that through use of the digital wrapper invention, including use of FEC, improves the optical performance of OTN 100. By using FEC, 3R regenerators can accommodate poorer signal to noise ratios. Consequently, a given optical amplifier can provide some combination of increased span length, number of spans, or number of optical channels.

FIG. 5 graphically illustrates one example of a basic frame structure that can be used for the optical channel. As shown, each sub-frame includes OCh-OH, Payload and Check Bytes. Each cell in the frame represents one byte and the numbers in the cells indicate the order of transmission of each byte. One such frame structure is described in the ITU-T G.975 document cited above.

FIG. 6 graphically illustrates one example of a multiframe, i.e., superframe, structure for the optical channel-overhead (OCh-OH). Since the basic frame structure described in G.975 includes only 16 bytes to carry overhead, the multiframe structure is employed for carrying the OCh-OH to allow sufficient flexibility for assigning overhead functions. The superframe structure shown provides 64 time slots that can be allocated among framing, parity check bytes and miscellaneous OCh-OH functions. One column of the OCh-OH multiframe, namely, frame 4, is allocated for end-to-end performance monitoring, in this example, between OEP 102 and OEP 118 (FIG. 1). In this example, a bit error rate (BER) indication is obtained by using bit-interleaved parity (BIP). The FEC process that is employed in the OCh, in this example, is used for performance monitoring on individual segments between FEC sites, for example, a segment between OEP 109 and OEP 112 (FIG. 1).

Returning to FIG. 3, rate shifting phase locked loop (PLL) 304 in response to the received clock rate generates a desired transmit clock rate that is supplied to OCh processor 303 and optical transmitter 305. OCh processor 303 adds the digital wrapper 206, in accordance with the invention, around the client signal payload envelope under control of controller 302. The formatted optical channel signal including the digital wrapper, is supplied at the transmit rate clock to optical transmitter 305, where it is converted to optical form and inserted in the optical channel layer of the transported optical signal. Again, such transmitters including electrical-to-optical converters and apparatus for formatting the optical signal for transmission are well known in the art.

Figure 7:
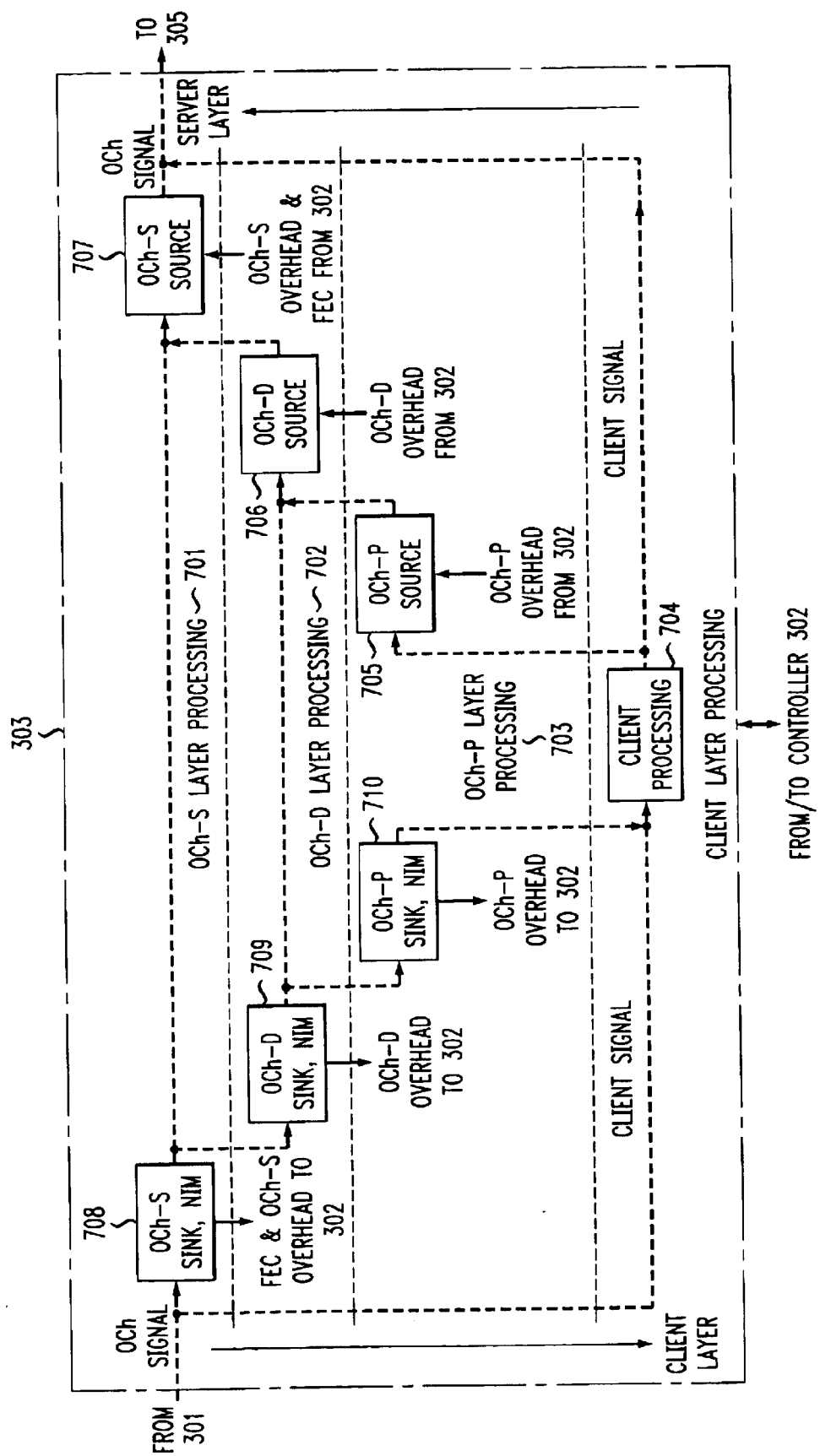
FIG. 7 illustrates the overall data flow for the OCh processor employed in the optical-electronic processor of FIG. 3.

FIG. 7 illustrates the overall data flow in the optical-electronic processor 300 and, specifically, in OCh processor 303 of FIG. 3. Specifically, shown are OCh-S layer processing 701, OCh-D layer processing 702, OCh-P layer processing 703 and client processing unit 704. Also shown are OCh-P layer source unit 705, OCh-D layer source unit 706, OCh-S layer source unit 707, OCh-S layer sink and nonintrusive monitor unit 708, OCh-D layer sink and nonintrusive monitor unit 709 and OCh-P layer sink and nonintrusive monitor unit 710. The possible signal flow paths are shown in dashed outline. An electrical version of the OCh signal from receiver 301 (FIG. 3), including the digital wrapper 206 that carries the OCh section layer, domain layer and path layer overhead, and the FEC performance monitoring information, is available to be supplied to OCh-S layer sink and nonintrusive monitor unit 708, and to client processing unit 704. The OCh-S layer overhead and FEC monitoring information can be extracted by OCh-S layer sink and nonintrusive monitor unit 708. Possible section layer signal flow with the OCh section overhead and FEC monitoring information removed is from OCh-S layer sink and nonintrusive monitor unit 708 to OCh-S layer source unit 707 and to OCh-D layer sink and nonintrusive monitor unit 709. The OCh-D layer overhead can be extracted by OCh-D layer sink and nonintrusive monitor unit 709. Then, possible domain layer signal flow is from OCh-D layer sink and nonintrusive monitor unit 709 to OCh-D layer source 706 and to OCh-P layer sink and nonintrusive monitor unit 710. The OCh-P layer overhead can be extracted by OCh-P layer sink and nonintrusive monitor unit 710. Then, possible path layer signal flow is from OCh-P layer sink and nonintrusive monitor unit 710 to client processing unit 704. As indicated above, an OCh client signal can also be supplied from receiver 301 to client processing unit 704. A processed OCh client signal can be supplied as an output to transmitter 305 and to OCh-P layer source unit 705, where OCh-P layer overhead can be inserted. Then, the OCh client signal including OCh-P layer overhead can be supplied to OCh-D layer source unit 706, where OCh-D layer overhead can be inserted. The OCh client signal including OCh-P layer overhead and OCh-D layer overhead can be supplied to OCh-S layer source unit 707, where OCh-S layer overhead can be inserted and FEC monitoring information may also be inserted. This results in the OCh client signal having a digital wrapper, in accordance with the invention, wrapped around the payload envelope carrying it. The resulting OCh signal is supplied to transmitter 305 for conversion to optical form for transmission.

Figure 8:
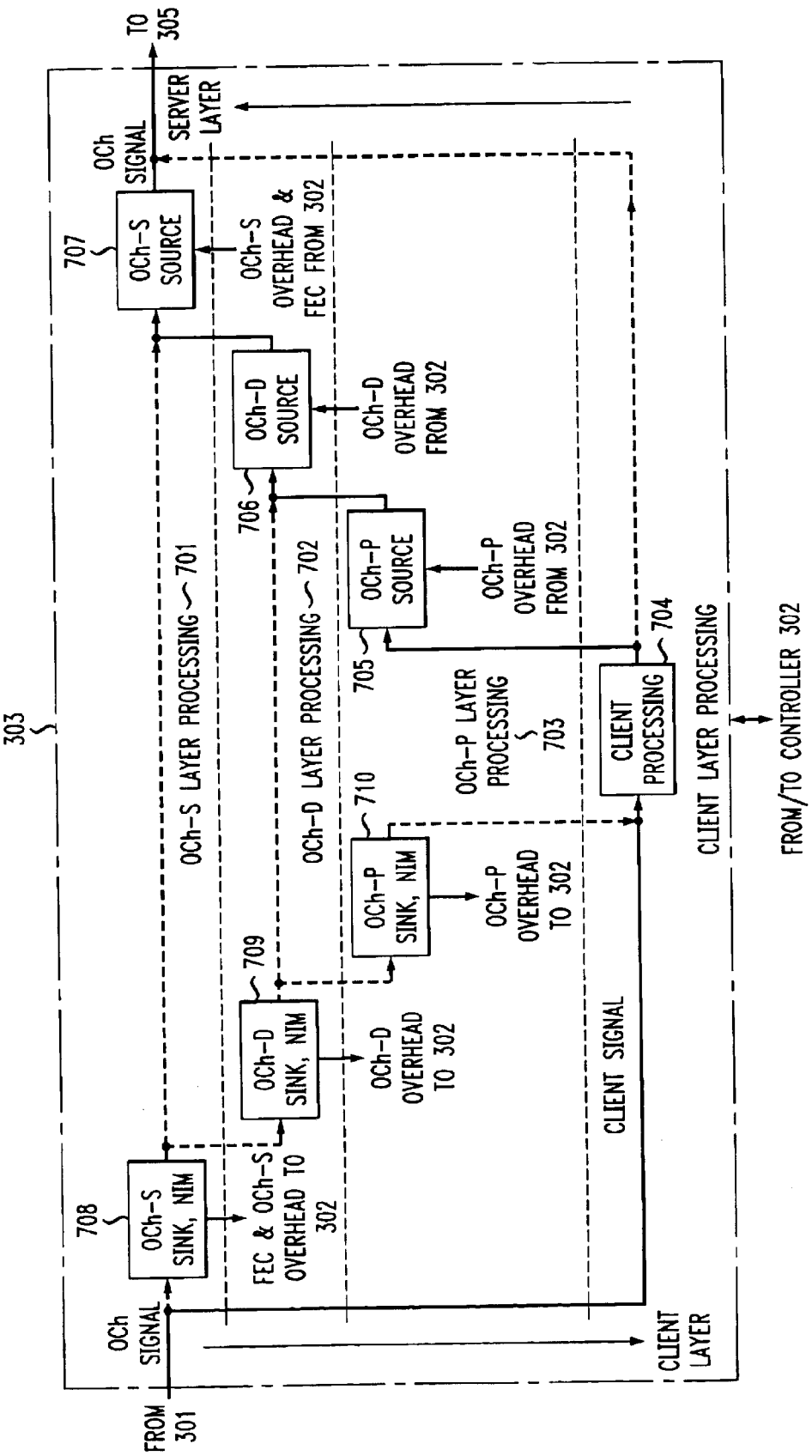
FIG. 8 illustrates the signal flow for a digital wrapper insertion mode of the optical-electronic processor of FIG. 3.

FIG. 8 illustrates the signal flow for a digital wrapper insertion mode in the optical-electronic processor 300 and, specifically, OCh processor 303 of FIG. 3. Note that elements of OCh processor 303 that are identical to those shown in FIG. 7 have been similarly numbered and will not be described again in detail. Then, a digital wrapper, in accordance with the invention, is inserted in the OCh signal by surrounding a client signal in a payload envelope with the OCh-P layer overhead, OCh-D layer overhead, OCh-S layer overhead and FEC monitoring information as shown in FIG. 4, and described above. This is realized by a client signal being supplied to client processing unit 704 and, then, to OCh-P layer source 705 where the OCh-P layer overhead, is inserted. Then, OCh-D layer overhead is inserted by OCh-D layer source 706 to yield a client signal surrounded by both the OCh-P layer and the OCh-D layer overhead. This combined signal is supplied to OCh-S layer source 707 where the OCh-S layer overhead and the FEC monitoring information is inserted to yield the OCh container 400 as shown in FIG. 4. The resulting OCh signal is supplied as an output to transmitter 305 where it is converted into optical form for transmission.

Figure 9:
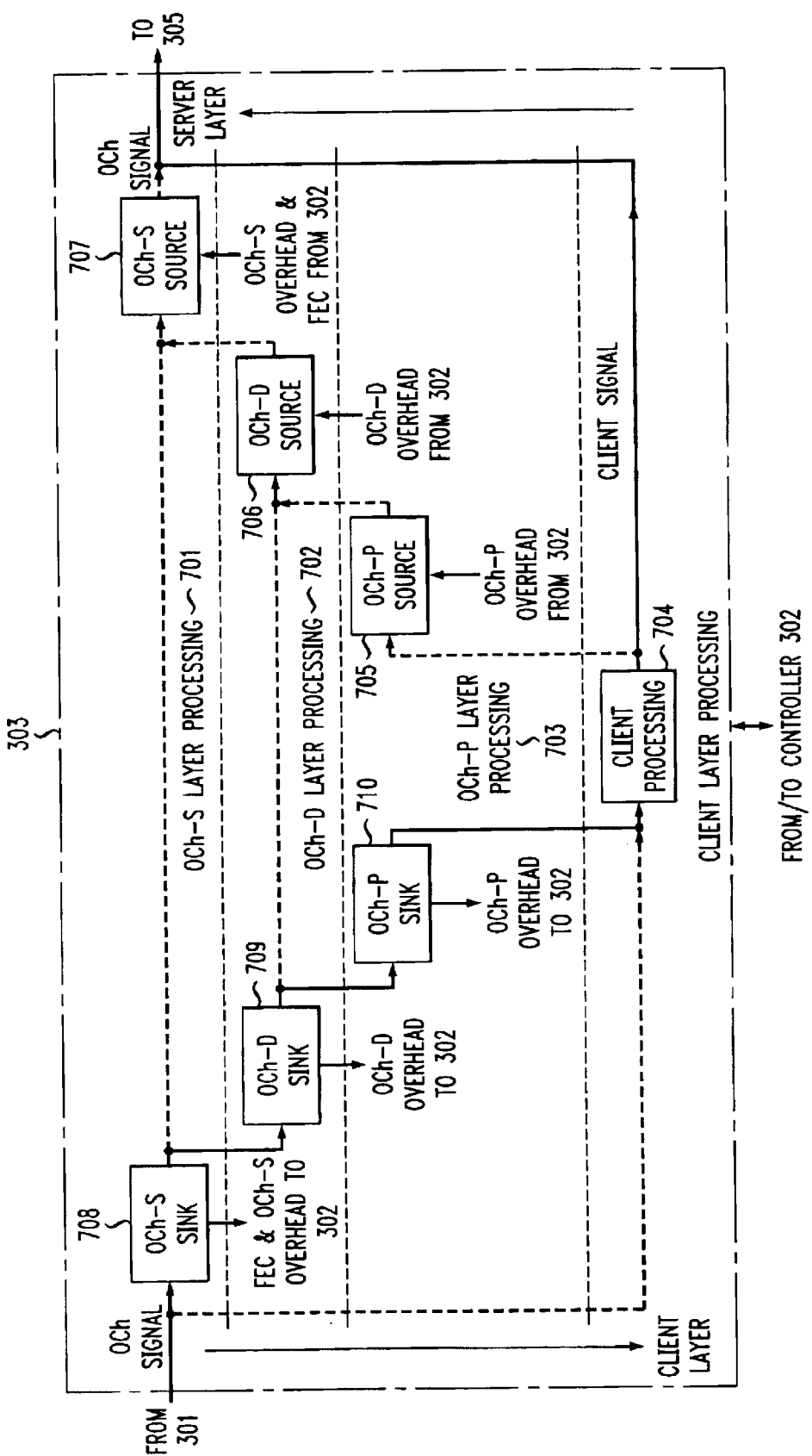
FIG. 9 illustrates the signal flow for a digital wrapper removal mode of the optical-electronic processor of FIG. 3.

FIG. 9 illustrates the signal flow for a digital wrapper removal mode in the optical-electronic processor 300 and, specifically, OCh processor 303 of FIG. 3. Note that elements of OCh processor 303 that are identical to those shown in FIG. 7 have been similarly numbered and will not be described again in detail. Then, a digital wrapper, in accordance with the invention, is removed by supplying an electrical version of an OCh signal from receiver 301 to OCh-S layer sink 708 where the FEC monitoring information and the OCh-S layer overhead is removed. Then, the OCh-D layer overhead is removed by OCh-D layer sink 709 and the OCh-P layer overhead is removed by OCh-P layer sink 710. The resulting client signal is supplied to client processing unit 704. In turn, the processed client signal is supplied as an output to transmitter 305.

Figure 10:
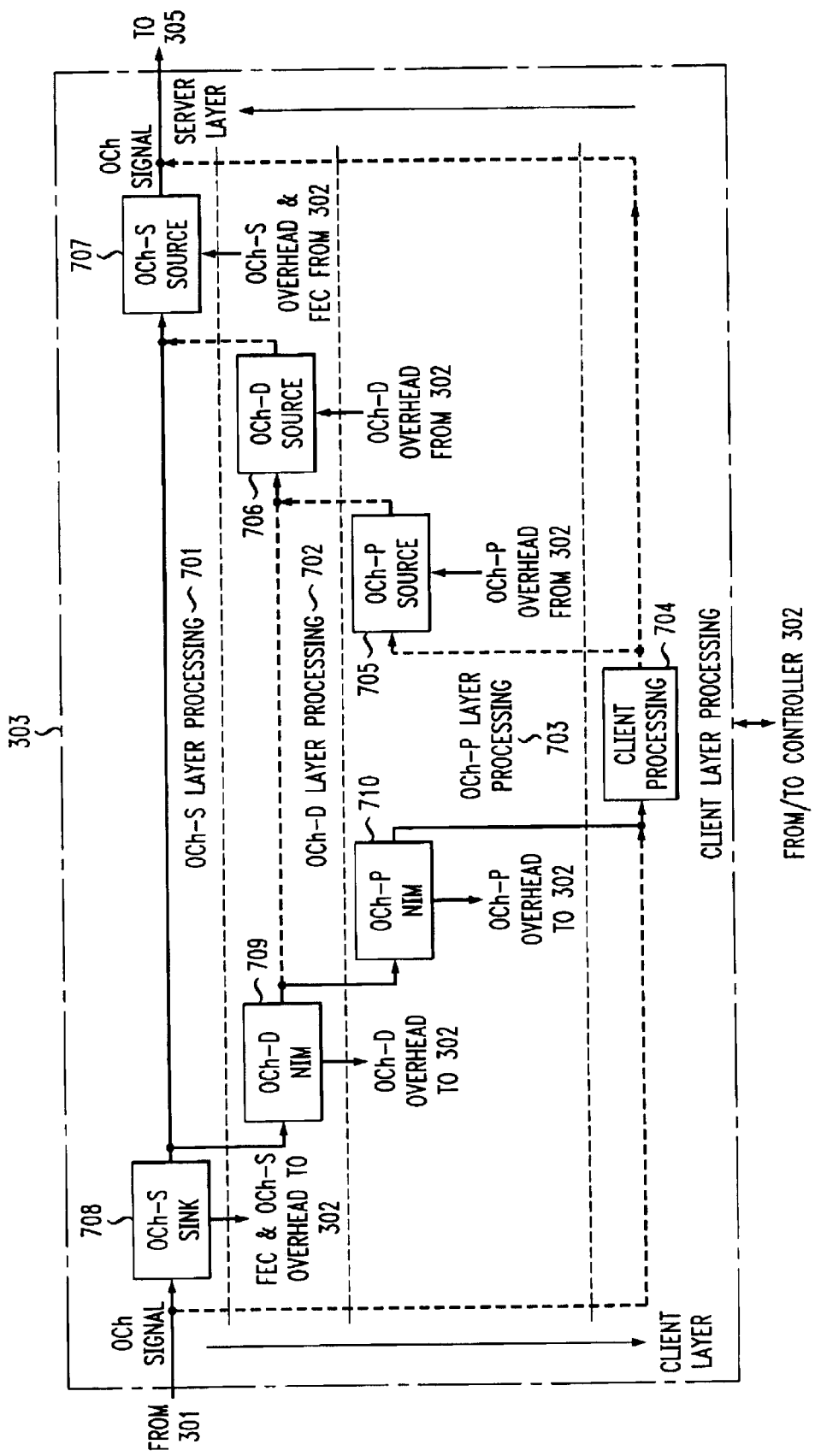
FIG. 10 illustrates the signal flow for the digital wrapper OCh-S layer access in the optical-electronic processor of FIG. 3.

FIG. 10 illustrates the signal flow for the digital wrapper OCh-S layer access in the optical-electronic processor and, specifically, OCh processor 303 of FIG. 3. Note that elements of OCh processor 303 that are identical to those shown in FIG. 7 have been similarly numbered and will not be described again in detail. Then, an electrical version of the OCh signal is supplied to OCh-S layer sink in 708, where the FEC monitoring information and the OCh-S layer overhead can be removed. The resulting signal is supplied to OCh-S layer source 707, where OCh-S layer overhead and FEC monitoring information is inserted, and to OCh-D layer nonintrusive monitor in 709, where the OCh-D layer overhead can be accessed. A signal from OCh-D layer nonintrusive monitor 709 is supplied to OCh-P layer nonintrusive monitor in 710, where the OCh-P layer overhead can be accessed. The OCh signal including the digital wrapper, in accordance with the invention, from OCh-S layer source 707 is supplied as an output to transmitter 305 where it is converted to optical form for transmission.

Figure 11:
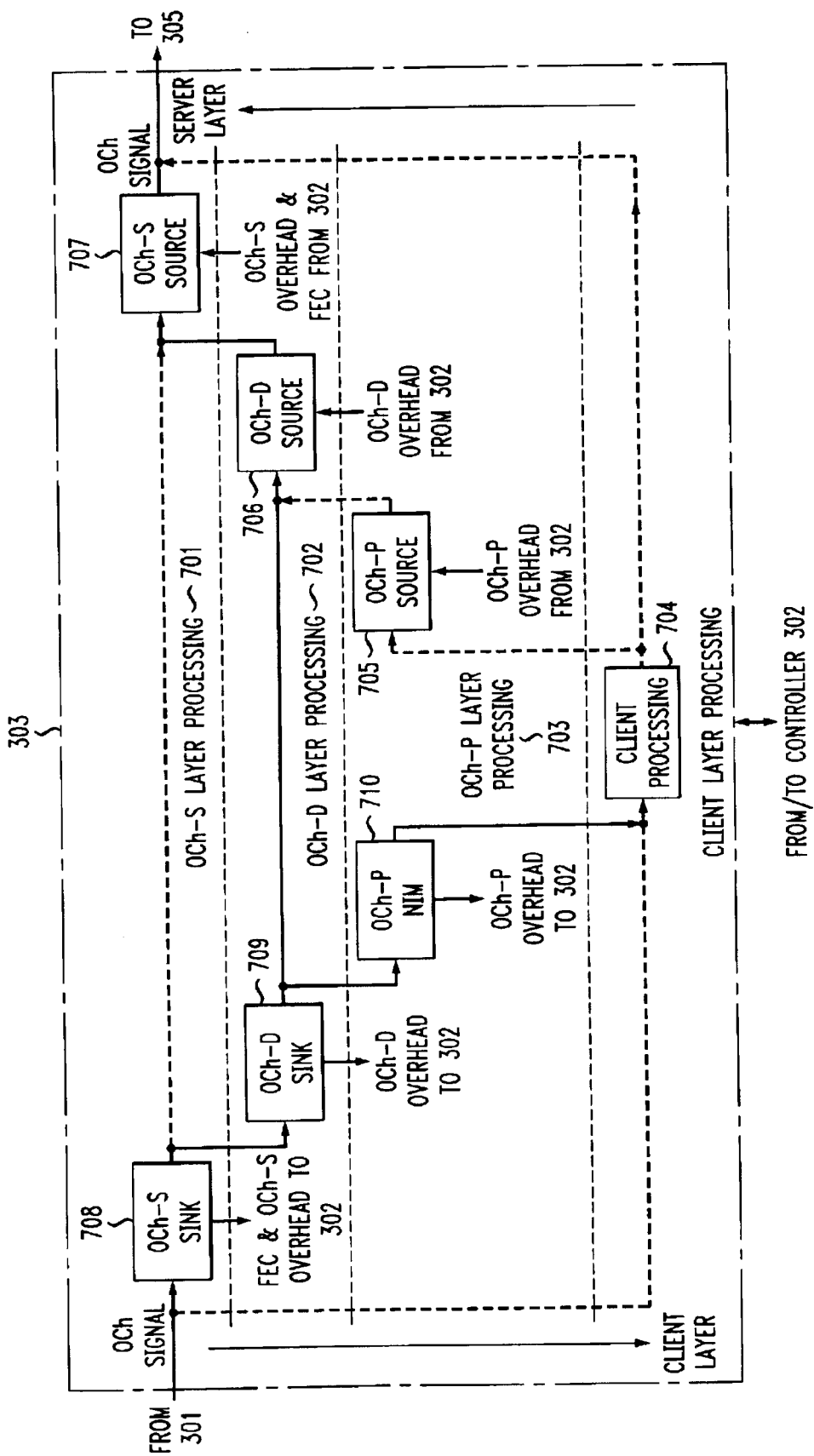
FIG. 11 illustrates the signal flow for the digital wrapper OCh-S & OCh-D layer access in the optical-electronic processor of FIG. 3.

FIG. 11 illustrates the signal flow for the digital wrapper OCh-S & OCh-D layer access in the optical-electronic processor and, specifically, OCh processor 303 of FIG. 3. Note that elements of OCh processor 303 that are identical to those shown in FIG. 7 have been similarly numbered and will not be described again in detail. Then, an electrical version of the OCh signal is supplied to OCh-S layer sink in 708, where the FEC monitoring information and the OCh-S layer overhead can be removed. A resulting signal is supplied to OCh-D layer sink in 709, where the OCh-D layer overhead can be removed. The resulting signal from OCh-D layer sink and non-intrusive monitor in 709 is supplied to OCh-D layer source 706, where OCh-D layer overhead can be inserted, and to OCh-P layer non-intrusive monitor in 710 where the OCh-P layer overhead can be accessed. A resulting signal from OCh-P layer sink and nonintrusive monitor 710 is supplied to client processing unit 704. The resulting signal from OCh-D layer source 706 is supplied to OCh-S layer source 707, where the OCh-S layer overhead and the FEC monitoring information can be inserted to yield an OCh signal including the digital wrapper, in accordance with the invention, which is supplied as an output to transmitter 305 where it is converted into optical form for transmission.

The above-described embodiments are, of course, merely illustrative of the principles of the invention. Indeed, numerous other methods or apparatus may be devised by those skilled in the art without departing from the spirit and scope of the invention.

What is claimed:

1. Apparatus for use in formatting an optical channel signal to be transported on an optical transport network comprising:
    a processor for allocating prescribed bandwidth for a client signal payload envelope in which said client signal floats without the need of pointers to identify it, for allocating first additional bandwidth, for allocating second additional bandwidth, for adding said first additional bandwidth to a first side of said prescribed bandwidth of said payload envelope bandwidth, and for adding said second additional bandwidth to a second side of said prescribed bandwidth of said payload envelope bandwidth, wherein said first and second additional bandwidths form a digital wrapper around said payload envelope bandwidth with said first and second additional bandwidths being associated with said optical channel in such a manner that said digital wrapper is independent of the type of client signal intended to be transported in the client signal payload envelop, and said payload envelope bandwidth forms a client optical signal format independent, constant bit-rate transport channel; and
    an insertor for inserting prescribed optical channel overhead information in said first additional bandwidth, which optical channel overhead is independent of the client signal format, wherein said payload envelope bandwidth, said first additional bandwidth and said second additional bandwidth form said optical channel signal and said digital wrapper that provide the benefits of inband overhead while not requiring further processing of said client signal intended to be transported in said payload envelope,
    wherein said transport network does not require that the client signal format be known to it.

2. The invention as defined in claim 1 wherein said optical transport network transports an optical signal including one or more wavelength division multiplexed optical channels.

3. The invention as defined in claim 2 further including a first converter for converting an incoming optical channel from an optical signal to an electrical signal for optical channel overhead processing and a second converter for converting an optical channel overhead processed electrical signal into an optical signal.

4. The invention as defined in claim 1 wherein said insertor controllably inserts optical channel section layer overhead information in said first additional bandwidth.

5. The invention as defined in claim 1 wherein said insertor controllably inserts optical channel domain layer overhead information in said first additional bandwidth.

6. The invention as defined in claim 1 wherein said insertor controllably inserts optical channel path layer overhead information in said first additional bandwidth.

7. The invention as defined in claim 1 further including an extractor for controllably removing overhead information from said first additional bandwidth.

8. The invention as defined in claim 7 wherein said extractor controllably extracts optical channel section layer overhead information in said first additional bandwidth.

9. The invention as defined in claim 7 wherein said extractor controllably extracts optical channel domain layer overhead information in said first additional bandwidth.

10. The invention as defined in claim 7 wherein said extractor controllably extracts optical channel path layer overhead information in said first additional bandwidth.

11. The invention as defined in claim 1 further including an accessor for controllably accessing said overhead information in said first additional bandwidth.

12. The invention as defined in claim 11 wherein said accessor controllably accesses optical channel section layer overhead information in said first additional bandwidth.

13. The invention as defined in claim 11 wherein said accessor controllably accesses optical channel domain layer overhead information in said first additional bandwidth.

14. The invention as defined in claim 11 wherein said accessor controllably accesses optical channel path layer overhead information in said first additional bandwidth.

15. The invention as defined in claim 1 wherein said insertor inserts prescribed error correction information in said second additional bandwidth.

16. The invention as defined in 15 wherein said prescribed error correction information is forward error correction information.

17. The invention as defined in claim 16 wherein said forward error correction information provides incremental performance information.

18. The invention as defined in claim 16 further including an extractor for controllably removing said forward error correction information from said second additional bandwidth.

19. The invention as defined in claim 18 wherein said extractor extracts said forward error correction information at an optical channel section layer.

20. The invention as defined in claim 18 wherein said insertor inserts said forward error correction information at an optical channel section layer.

21. A method for formatting an optical channel signal to be transported on an optical transport network comprising the steps of:
    allocating prescribed bandwidth for a client signal payload envelope in which said client signal floats without the need of pointers to identify it;
    allocating fist additional bandwidth;
    allocating second additional bandwidth;
    adding said first additional bandwidth to one side of said prescribed bandwidth of said payload envelope bandwidth;
    adding said second additional bandwidth to a second side to said prescribed bandwidth of said payload envelope bandwidth,
    wherein said first and second additional bandwidths form a digital wrapper around said payload envelope bandwidth with said first and second additional bandwidths being associated with said optical channel in such a manner that said digital wrapper is independent of the type of client signal intended to be transported in the client signal payload envelope, and said payload envelope bandwidth forms a client optical signal format independent, constant bit-rate transport channel; and inserting prescribed optical channel overhead information in said first additional bandwidth, which optical channel overhead is independent of the client signal format, wherein said payload envelope bandwidth, said first additional bandwidth and said second additional bandwidth form said optical channel signal and said digital wrapper that provide the benefits of inband overhead while not requiring further processing of said client signal intended to be transported in said payload envelope, wherein said transport network does not require that the client signal format be known to it.

22. The method as defined in claim 21 wherein said transport network transports one or more wavelength division multiplexed optical channels.

23. The method as defined in claim 22 further including the steps of converting an incoming optical channel from an optical signal to an electrical signal for optical channel overhead processing and converting an optical channel overhead processed electrical signal into an optical signal.

24. The method as defined in claim 21 wherein said step of inserting further includes a step of controllably inserting optical channel section layer overhead information in said first additional bandwidth.

25. The method as defined in claim 21 wherein said step of inserting further includes a step of optical channel domain layer overhead information in said first additional bandwidth.

26. The method as defined in claim 21 wherein said step of inserting further includes a step of optical channel path layer overhead information in said first additional bandwidth.

27. The method as defined in claim 21 further including a step of controllably removing overhead information from said first additional bandwidth.

28. The method as defined in claim 27 wherein said step of removing includes a step of controllably extracting optical channel section layer overhead information in said first additional bandwidth.

29. The method as defined in claim 27 wherein said step of removing includes a step of controllably extracting optical channel domain layer overhead information in said first additional bandwidth.

30. The method as defined in claim 27 wherein said step of removing includes a step of controllably extracting optical channel path layer overhead information in said first additional bandwidth.

31. The method as defined in claim 21 further including a step of controllably accessing said overhead information in said first additional bandwidth.

32. The method as defined in claim 31 wherein said step of accessing includes a step of controllably accessing optical channel section layer overhead information in said first additional bandwidth.

33. The method as defined in claim 31 wherein said step of accessing includes a step of controllably accessing optical channel domain layer overhead information in said first additional bandwidth.

34. The method as defined in claim 31 wherein said step of accessing includes a step of controllably accessing optical channel path layer overhead information in said first additional bandwidth.

35. The method as defined in claim 21 wherein said step of inserting includes a step of inserting prescribed error correction information in said second additional bandwidth.

36. The method as defined in claim 35 wherein said prescribed error correction information is forward error correction information.

37. The method as defined in claim 36 wherein said forward error correction information provides incremental performance information.

38. The method as defined in claim 36 further including a step of controllably removing said forward error correction information from said second additional bandwidth.

39. The method as defined in claim 38 wherein said step of removing includes a step of extracting said forward error correction information at an optical channel section layer.

40. The method as defined in claim 38 wherein said step of inserting includes a step of inserting said forward error correction information at an optical channel section layer.

* * * * *